Patented Nov. 12, 1940

2,221,683

UNITED STATES PATENT OFFICE 2,221,683

PROCESS FOR THE PURIFYING OF LIQUIDS WITH THE AID OF ACTIVE CARBONACEOUS COLLOIDS

Pieter Smit, Amsterdam, Netherlands, assignor to N. V. Octrooien Maatschappij "Activit", Amsterdam, Netherlands No Drawing. Application December 30, 1937, Serial No. 182,610. In the Netherlands January 11, 1937

9 Claims. (Cl. 127—46)

For the purification of liquids, technical science often makes use of solid substances of either organic or inorganic origin. Fuller's earth, calcium carbonate, aluminium hydroxide and, more especially, activated carbon, are among the most commonly applied. The action of these substances is mainly adsorptive, but also purely chemical actions often take place.

Among the technically purified liquids, sugar-juices play a prominent part, also solutions of reaction-products of various organic substances, such as flour, cellulose, etc., and vegetable extracts obtained by pressing or osmose.

Among the purifying agents of organic origin, activated carbon has become widely known.

In the course of the years, methods of application of this product have been almost standardized. Owing to its practically exclusively adsorptive effect and its high cost-price, this activated carbon is for preference used in pure surroundings for the removal of traces of impurities, which cannot otherwise be eliminated.

In the sugar-industry, for instance, activated carbon is mostly applied on rather pure sugar solutions, whereby sugar crystals have been freed, as far as possible, of their syrup-film by preaffining. It is true that spent activated carbon of which the purifying effect is no longer sufficient, is introduced in impure liquids and is then, mixed, for instance, with other solid substances, filtered off and removed from the factory, which is also customary in other kinds of industry.

In the glucose-industry, activated carbon which is no longer good for use, is removed together with the impurities of the glucose-syrup, which have formed during the neutralization or were already existent.

According to the present invention, active carbonaceous colloids are used for the purification of sugar-containing liquids, eventually in combination with other purifying agents, which colloids are obtained by the destructive dehydration of carbonaceous materials at a relatively low temperature, which does not, for instance, exceed 400° C. These dehydrating substances must intensely attack the carbonaceous material resulting in the formation of carbonaceous zeolites. Sulphuric acid, phosphoric acid and zinc chloride may be used as dehydrating substances in solutions of various concentration and also mixed with one another.

The present application is a continuation-in-part of my copending application, Serial Number 22,684, filed on May 22, 1935. In this prior application I have described and claimed the use of carbonaceous zeolites containing residual dehydrating agents in the purification of impure liquids in general. The present application is directed to the use in similar purification processes of carbonaceous zeolites in combination with other purifying agents, such as lime and aluminum hydroxide, and, more specifically, to the purification of sugar containing liquids with these zeolites, which may advantageously contain residual dehydrating agents.

These active carbonaceous colloids or carbonaceous zeolites highly deviate from ordinary activated carbon. Even their chemical composition is different, as their carbon content is relatively low (calculated on the dry basis), while they have a pronounced colloidal character and are liable, for instance, to become dispersed and coagulated.

Heating or an intense drying will partly, or even altogether destroy their structure; even a change of moisture-content or storage may cause alterations of the structure, which need not, however, be irreversible.

Their decolorizing power, in particular, and adsorptive power, in general, these colloids have in common with activated carbon, often even in degrees surpassing those of activated carbon. Albumins, gummy substances and pectins, which hinder filtration and froth-causing substances in general, are much better eliminated with these active colloidal substances than is the case with ordinary activated carbon. In addition, they have a pronounced property to exchange cations present in the liquids for those bound to the colloid, a property which ordinary activated carbon lacks altogether.

Apart from the ordinary adsorption, many other effects are produced in using these colloids, which are partly of a pronounced chemical character. Apart from adsorption and ion-exchange, we observe condensation and coagulation taking place, which has for result that more often than is the case with ordinary activated carbon, the elimination of impurities is irreversible.

Before use, it is not necessary to free the substance obtained by the reaction of dehydrating chemicals, from such chemicals, at least not completely, although there is no objection against applying thoroughly leached out material.

The dehydrating chemicals present in the substance can be bound either before or during admixture with a liquid to be purified, or the mixture may be adjusted at a certain pH, whereby formation of a precipitate may eventually take place. These manipulations will often help to improve the purifying effect. The tendency of the active carbonaceous colloid to be dispersed becomes more pronounced when in contact with pure liquids, also at a high pH and when certain cations are present. Ions of potassium, sodium or ammonium increase dispersion, calcium-ions or ions of heavy metals, also organic ion-groups, hinder dispersion, or they may coagulate together with a dispersion already formed.

The chemical character of the reaction, which takes place when dehydrating chemicals are brought to react on carbonaceous material, is highly complicated. It may be called a destructive dehydration.

Beside decomposition, whereby carbon formation takes place, or a formation at least of rather carbonaceous groups, a synthesis of substances is also caused owing to condensation- and hydration-phenomena. This has for result that certain raw materials produce more than their proper weight of colloids (calculated on a dry basis).

By adjusting temperature, water-content of components and mixing proportions, it is possible to obtain a material of pronounced humic character, which in the one extreme case is quite easily dispersed and will, under certain circumstances even be soluble, in the other extreme case the material obtained will approach the ordinary type of carbon produced with the aid of chemicals. Furthermore, the whole range of materials lying between these two extremes can be produced.

The reaction-components can be very cheap, if we take, for instance, saw-dust, bagasse etc. as carbonaceous material and, for instance, sulphuric acid of various concentrations as a chemical. It is possible moreover, to recuperate the chemicals, while the raw-material yields about six times the amount obtained when manufacturing activated carbon from it in the usual way. It is obvious, therefore, that these carbonaceous colloids can be produced at an exceedingly low cost-price.

The best material is obtained in the most economical way by mixing carbonaceous materials and sulphuric acid in such manner as to cause a spontaneous reaction to take place, which, of course, also applies to other chemicals.

Owing to the specific properties of these colloids and their low cost-price, they can according to the invention be used for the purification of liquids which cannot be economically purified by activated carbons, and also for other highly impure liquids which are difficult if not impossible to purify with ordinary activated carbons. This is, for instance, the case with liquids containing injurious metallic salts, or substances which cause froth formation and hinder filtration, such as albumins etc., or when the quantity of activated carbon required would be so large as to make its application impossible for economical reasons. In all these cases, however, active carbonaceous colloids give excellent results. Special purifying technics have often proved to be of advantage here.

For the manufacture of vegetable extracts in general and in the sugar industry in particular, when purifying soluble reaction products of certain carbonaceous substances, for instance glucose solutions, carbonaceous zeolites are applied with great advantage. They can also be applied for the purification of soiled water, of waste water, for instance. In these surroundings, activated carbon is not effectively applied, or, at least, its application would not be economical, so that in practice it is never used to this end.

In order to illustrate in what manner the carbonaceous colloids according to the invention should be applied, applicant gives a survey of the technical manufacturing- and purifying processes of the best known products as well as of the way in which the carbonaceous colloid is applied in them.

In sugar industry, a sugar containing liquid (raw juice) is obtained through osmose (from beet-roots, for instance) or pressing (from cane, for instance). Apart from saccharose, this raw juice contains many so-called non-sugars, which partly can be and also must be eliminated, in order to obtain a pure sugar from the liquid. Certain kinds of albumins, especially, and other substances present in colloidal form which for instance give rise to difficulties when filtering the liquids and which, moreover, are the cause of an extensive coloring of the juices, must be eliminated.

To this end, technical science applies lime, which partly serves as a neutralizing agent and partly, after it has been neutralized by means of an acid and precipitated, brings about special purifying effects. As a neutralizing agent, technical science makes use of carbonic acid and/or sulphurous acid. Neutralizing is often even done in two, or more, phases. Lately, lime is also often added in two, or more, phases, the first dose of lime being given for the purpose of a preliminary purification, the so-called pre-defecation, giving a certain additional effect as compared with the ordinary purifying process.

Applicant furthermore states that lime as well as carbonic- or sulphurous acid is often added continuously.

Here follows a survey of the most widely known purifying methods of juices with their elucidation.

(a) A minimum dose of lime is added to the raw juice in order to neutralize acids present in the juice or for adjustment to a certain pH, whereby the elimination of impurities reaches its highest possible point.

The so-called defecation-method of raw juice obtained from sugar-cane customary of old, may be classified here; also the modern methods of the so-called pre-defecation (Spengler, Téatini, Dédek Vasatko, a. o.). Various optimal points were found to exist, at which an extensive elimination of impurities from the liquids takes place and it is an established fact, that for every kind of impurity there exists a certain optimal isoelectrical point, at which it coagulates.

With most of the "pre-defecation methods" those concerned just content themselves with adding as much lime as is required for obtaining an optimal point at which on the whole the removal of injurious impurities is largest. For beet-root juices, this lies in the pH-range of between 10.6 and 11, dependent on various factors, as, for instance, nature of beet-roots, etc.

With these "pre-defecation" methods, the fact should not be overlooked that the form in which these impurities are eliminated is of great importance, as it is quite possible for substances once eliminated to dissolve again. It is therefore recommended to take care that coagulation is of a coarse-grained structure, as this shows a greater stability. This obtains especially when, after lime has been added for predefecation, a second dose of lime is added without previous filtering. This second dose is generally necessary to make filtration of the liquid possible. It is well-known that heat also increases the filtration, but it likewise furthers re-dissolving of impurities.

Téatini seeks to attain this end by adding sulphurous acid to the defecated juice and thus procures stability of the eliminated substances; Dédek-Vasatko adds lime only slowly and gradually whereby the coagulation-particles get very coarse-grained, as they are allowed to grow and therefore can peptize only very slowly, when exceeding the optimal point. A further advantage of great importance lies in the fact that all optimal points are passed so that far more impurities coagulate.

The ideal effect of pre-defecation would be that it makes a further purification of the juices superfluous, but the elimination of precipitated impurities from the juices meets with such great difficulties that, if only for this reason, additional purification will generally prove necessary, in order to obtain a liquid that can be filtered.

When producing sugar from sugar-cane, manufacturers often content themselves with removing impurities present in the juice by means of decantation, filtration being altogether impossible. In the beet-root sugar-industry, filtration likewise meets with enormous difficulties. It is difficult anyhow to obtain a pure sugar from the juice after pre-defecation, although in the tropics raw sugar is being made from it.

For an eventual further purification, less lime is required. Pre-defecation can be carried out hot as well as cold; it is also possible to heat the pre-defecated cold juice before it is subjected to further lime-treatment. It is not a general rule to use fresh lime for pre-defecation, part of the solution to which an excess of lime has been added after pre-defecation has taken place will serve the purpose.

(b) Adding an excess of lime to the raw-juice or to the pre-defecated juice with subsequent lime-neutralization. According as this juice is treated with carbonic or sulphurous acid, we often distinguish between carbonation- and sulphitation methods. If neutralizing is done in one, we speak of a single, if it is done in two stages, we speak of double carbonation or sulphitation.

*Single carbonation* is customary only in sugar-factories in the tropics, where saturation is carried on until the pH is about 7; the temperature is kept low in order to prevent decomposition of glucose in the juices. For the same reason, lime and carbonic acid are often added simultaneously, which serves to prevent high alkalinities.

*Double carbonation* is customary both in beet-root and in cane-sugar factories. The idea is to first filter off substances that have been eliminated at a certain pH and would re-dissolve again as saturation goes on.

*Single sulphitation.*—Sulphurous acid is used instead of carbonic acid. As a rule, less lime is applied than is the case with carbonation. This method is chiefly applied in sugar factories in the tropics, as is the case with

*Double sulphitation*, for which the same remarks obtain as given under the heading "double carbonation." When applying sulphitation-methods, juices, as a rule, are not filtered, this being practically impossible on account of the lower lime-addition customary here.

Sulphurous acid is applied even after the juice has been filtered and purified. Sulphitation of purified thin juice, at times even of thick juice, usually takes place; often sulphitation of juice is likewise applied before concentrating it to its final strength.

With all these methods for the purification of juices, it has been found according to the invention that the application of active carbonaceous colloid in combination herewith offers large advantages, as, for instance, a better filtration, a lower lime-consumption together with decreased quantities of neutralizing means and increased purifying effect. When pre-defecation is applied, the active carbonaceous colloid can be added at any desired stage of the process. Its application before lime-addition has taken place, gives the advantage of a better stabilization of the impurities already eliminated checking at the same time to a certain extent their peptization when passing the optimal point, which peptization would injure the purifying effect. It also means a furthering as well as an improvement upon the coagulation-process, owing to the fact that the colloid adsorbs and eventually coagulates the peptized impurities, or that these impurities coagulate together with the finely distributed colloid. A like effect is also obtained when mixing the colloid with the liquid simultaneously with lime-addition, or following it. The possible variations of these combined procedures bear their special influence upon the filtering capacity of the juice; filtration is best, as a rule, when the colloid is mixed with the juice after lime-addition has taken place, although in many cases the effect is not influenced by the way in which addition has taken place. A combination of pre-defecation with colloid-application makes it possible to obtain a juice from which a pure white sugar can be made without further lime-addition. Especially the combination with the so-called progressive pre-defecation of Dédek-Vasatko gives very good results.

Endeavours to obtain a good final product merely with the aid of pre-defecation established the fact that the temperature during such pre-defecation should be kept as low as possible and should, for instance, not exceed 50° C. before filtration takes place, as otherwise a dark coloured juice would result. With this low temperature, filtration is not possible unless a carbonaceous colloid according to the invention is applied. This application also means a decreased lime-content of the filtrates, which content is too high with juices obtained by mere pre-defecation.

It is quite possible to first use the colloid on already purified juices of lower pH. It is a striking fact that by so doing the impurities that have been absorbed by the colloid, coloured matter, for instance, are not released in this rather alkaline environment, which is the case with ordinary activated carbon, so that the binding, apparently, is irreversible. This irreversible binding is especially increased by adding the fresh colloid to the thin juice and filtering it off after concentration has taken place, so that it remains in contact with the liquid for a longer period. The same observations hold good when applying the colloid in other juice-purifying methods.

Generally speaking, application of the carbonaceous zeolite is recommended before saturation takes place. The repeated application will have to be effected in such a way that each time it is applied on liquids of greater impurity, so that its course through the manufacturing process is opposite to that of the juice. Here too it shows that for the greater part the adsorbed impurities are bound in such a way as not to be released again in liquids in which the adsorptive equilibrium has been destroyed to disadvantage; the setting free, for instance, of coloured matter does not, practically, occur in the rather alkaline medium of limed juice.

Sugar refineries likewise when using the colloid according to the invention are able to apply other purifying methods. It was, for instance, found possible in many cases to do away with the affining of raw-sugar, hitherto generally applied, as it is possible to obtain a good product from the colloid-treated raw-sugar solution. In the same way we can proceed with solutions of sugar which are only imperfectly affined or which are of such inferior quality, even when affined, as to make it very difficult indeed to make a good sugar from it. Just as is the case with the purification of juices, colloid application for the purification of these sugar solutions is to advantage combined with the methods since long applied to the same end, as, for instance, addition of lime with subsequent neutralization and addition of gels—aluminum hydroxide, silicic acid, sulphate of barium—(which gels can be formed also in the sugar-solutions) of albumins, blood and even of ordinary activated carbon. Applicant has found that small quantities of these substances if applied in combination with the colloid give great purifying effects.

It is possible for glucose-manufacturers to employ the colloid to purify raw-materials of inferior quality than hitherto applied. The colloid may, after it has, eventually, first been used on almost pure glucose-solutions, be once more applied in the neutralizing-vat, or else be added to the flour-suspension which causes in combination with the substances which are insoluble in the liquid, a large purifying effect. When purifying water, waste-water, especially, the colloid once used for an after treatment of water, can be mixed with impure water, in which floating matter has formed or been added to. Especially the purification of iron containing water or waste-water proves successful; here too the colloid is for preference applied in combination with the known precipitation methods.

As a carrier of bacteria it is usefully applied in the activated sludge method.

*Example 1.*—Fresh raw-juice from beet-root or cane is heated up to 95° C. and then mixed with the material, which had been obtained, by heating a mixture of one part of saw-dust with two parts of sulphuric acid, 66° Bé., at 150° C., followed by leaching and grinding. After having filtered the juice, the pH of which had first been adjusted to 6.8 by adding a small quantity of lime, an almost colourless juice was obtained, in which no iron could be traced using a solution of potassium ferricyanide. The purity quotient of this juice was 94.1 as against 91.3 for the raw-juice.

Using unleached carbonaceous zeolite, in which, however, the acid had previously been bound with the aid of barite, gave an even higher decolorized juice of which the purity quotient was 94.4.

*Example 2.*—Sufficient of the acid-containing material, prepared according to Example 1, is added to the limed juice, that is the juice to which the excess of lime has been added, to adjust the pH to 7 at a temperature of 90° C., after which it is filtered. The filtrate contains only 12% of the coloured matter present in ordinary thin juice. About the same result is obtained as with juice in which previously the lime has largely been precipitated, followed by the introduction of carbonic acid and filtration. The correct pH can be obtained either by adding partly leached material or introducing carbonic acid.

*Example 3.*—To raw-juice which has been obtained from beet-roots by osmose, and which is free of invert-sugar, 0.3% of lime, calculated on the weight of the beet-roots from which the juice has been obtained, is gradually added over a period of about 25 minutes; at the same time, likewise gradually, 1% active carbonaceous colloid is added which has been obtained by mixing one part of saw-dust containing 12% water with 3 parts of sulphuric acid 63° Bé. and at a temperature of 140° C., after which the mixture was leached with water and the colloid thoroughly ground.

Instead of sulphuric acid, a solution of zinc chloride, of phosphoric acid, etc., or mixtures of these substances can be used for the manufacture of the colloid.

The liquid then flows through a high velocity pre-heater and is brought up to a temperature of 96° C., after which it can be filtered through filter-presses.

1% fresh carbonaceous colloid is added to the filtrate and the mixture given a pH of 7 by introducing either carbonic- or sulphurous acid, after which it can be filtered.

The solids that have been filtered off can be used for a pre-treatment of the raw juice, instead of fresh carbonaceous colloid. The filter-cake resulting from the first filtration is removed from the factory after it has been leached out and provides a good manure. The juice resulting from the second filtration shows a better colour than that of thin juice obtained in the ordinary way and has also a good purity-quotient. After concentration, a first class white sugar can be obtained from it.

In case the raw-juice contains invert-sugar, if, for instance, frozen beet-roots are worked, the juice may not be heated beyond 60° C. before neutralizing it to a pH of 7. When working old or frozen beet-roots, it may often be desirable after the quantity of lime required for pre-defecation has been added, to add a further amount of lime, than to saturate, after which filtration can take place.

*Example 4.*—0.5% of lime added as lime-water and calculated by weight is gradually added to the raw-juice obtained from sugar-cane by pressing. Also 1.2% of active carbonaceous colloid, which has already served for after-purification, and sulphurous acid. This is done in such a way as to make sure that the pH does not exceed 10, while finally saturation is carried on until the pH is 7.4. The mixture is then heated up to 70° C., but even before treating it the juice may be heated up to this temperature.

1.2% fresh active carbonaceous colloid is added to the filtrate, the pH is reduced to 7 with the aid of soda; the filtrate then passes through the evaporator-station and is concentrated to about 60° Brix, whereby the colloid and the precipitated substances are eliminated. The thick juice is filtered and then boiled to massecuites.

*Example 5.*—0.5% carbonaceous colloid is added to the raw-juice obtained from beet-roots and then a quantity of lime is added at once sufficient to give the juice a pH of about 10.6. The juice now is heated up to about 90° C; again lime is added (0.6%). By introducing carbonic acid the pH is again brought up to about 10.6; the juice is filtered, carbonated until the pH is about 8.5, and again filtered off. 0.5% of fresh carbonaceous colloid is added to the thin juice thus obtained which is now concentrated; the resulting thick juice is sulphitated until the pH is 6.8 and then filtered. A thick juice results which is sparkling and much lighter in colour than the thick juice obtained in the usual way. The course of the carbonaceous colloid will for preference be as follows:

Fresh colloid is added to the filtered thin juice and filtered off, then being added to the thick juice and filtered off, then added to the first carbonation juice, again filtered off and finally, added to the raw-juice.

This process is particularly suitable for working old beet-roots. When working the ordinary material, however, the colloid may be just as well added simultaneously with lime or afterwards.

*Example 6.*—About 0.8% of lime (calculated on cane) and 0.2% of soda is added to the raw-juice obtained from cane-sugar. Then 0.4% of colloid is added, which may have been used already for the after-purification of the juice.

By introducing sulphurous acid the pH is adjusted to 7.1 and, after heating, the colloid is filtered off the juice together with lime-compounds and impurities. If no colloid is added, filtration is practically impossible. The filtered juice can, eventually, be once more treated with the fresh colloid.

Raw juice can be treated in various ways. The juice can be heated up to 70° C. and a liquid containing lime and the colloid is added simultaneously with the sulphurous acid in such a way that the pH is never far from 7. In this way, glucose decomposition is very insignificant. Lime and colloid may also be added at once and the juice heated at a temperature not exceeding 50° C., after which saturation follows. Saturation may take place in 2 stages. Here again the course of the colloid can be opposite to that of the juice.

*Example 7.*—1.1% lime is added to raw-juice obtained from beet-roots; also 0.1% colloid which has already served for the after-purification of the juice. The juice is then carbonated and filtered off as usual; again 0.1% colloid which has already been used is added and carbonation and filtering takes place for the second time in the usual way. The filter-cake is added to the juice of the first carbonation. Fresh colloid is added to the filtrate; sulphitation takes place either previous to or after adding the colloid, but can also be done after concentration has taken place. Either before or after concentration has been carried out, the colloid is filtered off and added to the only once filtered juice. With this process, a juice of superior colour and purity is obtained, though less lime has been applied. The colloid is extremely finely ground in a tube-mill; it passes, for instance, a sieve of 130 mesh and is so-to-say of collodial fineness.

*Example 8.*—Suriname raw-sugar is dissolved to 60° Brix, heated to up 80° C. and treated with 1½% colloid. If required, care should be taken that the pH does not fall under 6.8, by adding lime or soda. After a time of contact of 15 minutes, filtration takes place. From this filtrate, a refined sugar of very good quality can be obtained. The filtrate, if desired, may receive a second colloid-treatment, before being concentrated. This way of processing is particularly advantageous when working raw-sugar of bad grains, which is very difficult to affine in the usual way.

*Example 9.*—Besides 1% colloid which may already have been used for after-purification, 1% lime is added to the raw-sugar solution according to Example 6; by adding carbonic or sulphurous acid, the pH is adjusted at 6.8. Instead of lime, it is also possible to use 0.1% aluminum hydroxide, either formed in the liquid or added; it should, however for preference be fresh.

*Example 10.*—A third quality potato-flour is mixed with water and 1% colloid from which the acid has not, at least not completely, been leached out, so that a flour-suspension of 20° Bé. results. Before boiling, this flour-suspension is converted into a glucose-solution, neutralized and filtered. The filtrate may be treated with leached colloid, which is also added to the flour-suspension after filtration has taken place. Instead of adding the acid colloid directly to the flour-suspension, it may be previously brought into the converter, in which conversion of the flour takes place.

*Example 11.*—110 grams of colloid are added for each cubic meter of iron containing ground water immediately after this has been pumped; air is introduced and then the mixture is filtered. The filtrate obtained is iron-free and less hard than water which has not been subjected to colloid-treatment.

*Example 12.*—Waste-water which has been prepurified and is practically free from floating matter is purified by the activated-sludge system. This activated sludge also contains colloid as carrier of micro-organisms. 20 grams of colloid are practically lost per cubic meter of waste-water. This is a quicker process for purifying waste-water than that hitherto applied and one which gives superior results.

*Example 13.*—30 grams of colloid and 30 grams of aluminum hydroxide are added to the waste-water and, after a certain time of stirring, allowed to precipitate.

Having fully described my invention, what I claim as new and desire to secure by Letters Patent, is:

1. In the purification of impure liquids, the process which comprises contacting a liquid to be purified with a solid purifying agent, selected from a class consisting of insoluble calcium and aluminum compounds, in the presence of a small amount of a carbonaceous zeolite, formed by the destructive dehydration of a carbonaceous material with a strongly dehydrating chemical, selected from a class consisting of sulfuric acid, phosphoric acid and zinc chloride.

2. The process of claim 1 wherein said zeolite, when added to the liquid to be purified, contains at least a substantial proportion of the residual dehydrating agent employed in said destructive dehydration.

3. In the purification of impure sugar liquors, the process which comprises contacting such a sugar liquor with a solid purifying agent, selected from a class consisting of insoluble calcium and aluminum compounds, in the presence of a small amount of a carbonaceous zeolite, formed by the destructive dehydration of a carbonaceous material with a strongly dehydrating chemical, selected from a class consisting of sulfuric acid, phosphoric acid and zinc chloride.

4. The process of claim 3 wherein said zeolite, when added to said impure sugar liquor, contains at least a substantial proportion of the residual dehydrating agent employed in said destructive dehydration.

5. The process of purifying sugar liquors which comprises contacting such a liquor with lime in quantity sufficient to produce the precipitation of impurities and contacting the limed liquor with a small quantity of a carbonaceous zeolite then removing the spent zeolite and the resulting precipitate from the liquor; said carbonaceous zeolite being formed by the destructive dehydration of a carbonaceous material with a strongly dehydrating chemical, selected from a class consisting of sulfuric acid, phosphoric acid and zinc chloride.

6. In the manufacture of sugar, the process which comprises purifying a sugar liquor by treatment with lime in the presence of a small quantity of a carbonaceous zeolite; formed by the destructive dehydration of a carbonaceous material with a strongly dehydrating chemical, selected from a class consisting of sulfuric acid, phosphoric acid and zinc chloride; then gassing the liquor with a gas selected from a class consisting of $SO_2$ and $CO_2$ and separating the zeolite and the precipitated matter from the resulting purified liquor.

7. The process of claim 6 wherein said carbonaceous zeolite, when added to said sugar liquor, contains at least a substantial proportion of the residual dehydrating agent employed in said destructive dehydration.

8. In the process of purifying sugar liquors wherein such a juice is passed in succession through the usual purifying steps including defecation and gassing, the improvement which comprises adding a small amount of a carbonaceous zeolite to the sugar liquor during one of said purifying steps; said zeolite being one; formed by the destructive dehydration of a carbonaecous material with a strongly dehydrating chemical, selected from a class consisting of sulfuric acid, phosphoric acid and zinc chloride; then removing the partially spent zeolite from said liquor and introducing it into a purification step preceding said first mentioned purification step.

9. The process which comprises carbonating a limed sugar juice in the presence of an added carbonaceous zeolite formed by the destructive dehydration of a carbonaceous material with a strongly dehydrating chemical, selected from a class consisting of sulfuric acid, phosphoric acid and zinc chloride.

PIETER SMIT.